US012358175B2

(12) United States Patent
Blosser et al.

(10) Patent No.: US 12,358,175 B2
(45) Date of Patent: Jul. 15, 2025

(54) BUNDLE BREAKER HAVING MOVABLE PLATEN AND KIT FOR RETROFITTING BUNDLE BREAKER WITH MOVABLE PLATEN

(71) Applicant: A. G. Stacker Inc., Weyers Cave, VA (US)

(72) Inventors: Jerry Blosser, Crimora, VA (US); Randall Donn Senger, Mount Sidney, VA (US); Joseph Wunder, Lexington, VA (US); Eric Stempihar, Rockingham, VA (US)

(73) Assignee: A. G. Stacker Inc., Weyers Cave, VA (US)

( * ) Notice: Subject to any disclaimer, the term of this patent is extended or adjusted under 35 U.S.C. 154(b) by 501 days.

(21) Appl. No.: 17/831,511

(22) Filed: Jun. 3, 2022

(65) Prior Publication Data

US 2022/0388193 A1 Dec. 8, 2022

Related U.S. Application Data

(60) Provisional application No. 63/197,051, filed on Jun. 4, 2021.

(51) Int. Cl.

*B26F 3/00* (2006.01)
*B26D 7/04* (2006.01)
*B26D 7/06* (2006.01)

(52) U.S. Cl.

CPC ................ *B26F 3/002* (2013.01); *B26D 7/04* (2013.01); *B26D 7/0625* (2013.01); *B26D 7/0675* (2013.01); *B26F 2210/02* (2013.01)

(58) Field of Classification Search

CPC ............. Y10T 225/325; Y10T 225/357; Y10T 225/10; Y10T 225/12; Y10T 225/371;

(Continued)

(56) References Cited

U.S. PATENT DOCUMENTS 3,517,869 A * 6/1970 Dryon .................. C03B 33/033 225/2
6,655,566 B1 * 12/2003 Martin .................... B26F 3/002 225/101

(Continued)

FOREIGN PATENT DOCUMENTS

WO 2008129579 A2 10/2008

*Primary Examiner* — Jennifer S Matthews
(74) *Attorney, Agent, or Firm* — J-TEK LAW PLLC; Jeffrey D. Tekanic; Scott T. Wakeman

(57) ABSTRACT

A bundle breaker including first and second platen assemblies mounted above upstream and downstream breaking supports with first and second actuators for moving the platen assemblies toward and away from the breaking supports and a third actuator for moving the downstream breaking support to perform a breaking operation. The first platen assembly and/or the second platen assembly each includes an upper platen assembly and a lower platen assembly supported by the upper platen assembly, the upper platen assembly including an upper platen and a support for the upper platen and the lower platen assembly including a lower platen supported for movement relative to the upper platen in the vertical direction and relative to the upper platen in the longitudinal direction.

21 Claims, 10 Drawing Sheets

(58) Field of Classification Search
CPC .......... B26F 3/00; B26F 3/002; B26D 7/1827; B26D 7/04; B26D 7/0675; B26D 7/02; B26D 7/025; B26D 2007/013; B65H 35/10; B65H 2301/51514
See application file for complete search history.

(56) References Cited

U.S. PATENT DOCUMENTS

| | | | | |
|---|---|---|---|---|
| 6,776,748 | B2 * | 8/2004 | Joux .................... | B26D 7/1827 225/104 |
| 7,370,783 | B2 * | 5/2008 | Hubrecht ............. | B26D 7/1827 225/101 |
| 8,763,873 | B2 * | 7/2014 | Jans ........................ | B26F 3/002 225/96.5 |
| 2010/0108732 | A1 | 5/2010 | Gendreau et al. | |
| 2021/0308896 | A1 | 10/2021 | Allen, Jr. et al. | |

* cited by examiner

BUNDLE BREAKER HAVING MOVABLE PLATEN AND KIT FOR RETROFITTING BUNDLE BREAKER WITH MOVABLE PLATEN

TECHNOLOGICAL FIELD

The present disclosure is directed to a bundle breaker having at least one movable platen and to a kit to retrofit a bundle breaker with at least one movable platen.

BACKGROUND

Many products are manufactured in elongated sheets that can be separated into individual blanks along scored or perforated or partially cut lines. For example, corrugated paperboard blanks, from which boxes and other structures may subsequently be formed, are often formed in this manner.

An elongated sheet of corrugated paperboard may be divided by score lines into, e.g., five separate blanks. The score lines generally run transversely, that is, perpendicular to the length of the elongated sheet. When a plurality of the sheets are arranged in a stack, the score lines are aligned vertically. Such a stack of elongated sheets made up of individual blanks is sometimes referred to as a "log." During the processing of logs, it is necessary to break individual stacks of sheets from the log along the vertically aligned score lines (a location sometimes referred to as a "breaking plane" or "breaking junction" or "breaking region"). A stack of sheets that has been broken off a log may be referred to as a "bundle." The individual portions of the log that will be broken off the log may also be referred to as "bundles" even when they are still attached to each other in the log. Therefore, a log will comprise a plurality of bundles joined together at transverse score lines which bundles can be broken off the log one at a time to form individual bundles.

Machines that receive logs and break individual bundles from the logs are known as "bundle breakers." A bundle breaker generally includes two bottom support sections, each of which may include a conveyor, and two movable platens, one mounted over each support section. The downstream support section can tilt or pivot relative to the upstream support section. In operation, a log is moved along the bundle breaker until a score line between a first bundle of the log and a second bundle of the log is arranged at a junction of the first conveyor and the second conveyor, and the first bundle is then clamped against the downstream support section by the first platen and the second portion of the log is clamped against the upstream support section by the second platen. An actuator then shifts one of the support sections, usually the downstream support section, relative to the upstream support section to break the log along the score lines and separate the first bundle from the log. That first bundle is then moved away from the remaining portion of the log, and the log is shifted further downstream until the score lines separating the second bundle of the log from the third bundle of the log arrives at the breaking location at which time the process repeats until all bundles that formed the original log have been separated.

The operation of a conventional bundle breaker is described below with reference to FIGS. 1-5.

FIG. 1 shows a conventional bundle breaker 10. The bundle breaker 10 includes a frame 12 supporting an upstream breaking conveyor 14 and a downstream breaking conveyor 16. A first platen assembly 18 including a first platen 19 is mounted to the frame 12 above the upstream breaking conveyor 16, and a second platen assembly 20 including a second platen 21 is mounted to the frame 12 above the downstream breaking conveyor 16.

The first platen assembly 18 is connected to the frame 12 by a first platen support 46, and the second platen assembly 20 is connected to the frame 12 by a second platen support 48. The first platen support 46 will primarily be discussed hereafter, it being understood that the second platen support 48 is substantially identical thereto. The first platen support 46 includes a frame 50 to which the first platen 19 is attached, first and second side supports 52, a motor mount 54 supported by the frame 50 at a location between the first and second side supports 52 and a motor 56 supported by the motor mount 54. The motor 56 of the first platen assembly 18 may be referred to as a "first actuator"; the motor 56 of the second platen assembly 20 may be referred to as a "second actuator." Each of the side supports 52 has inner sides that face the motor 56 and outer sides that face away from the motor 56. Each of the side supports 52 includes a notch 58, and a platen assembly drive shaft 60 extends from either side of the motor 56 through the notches 58. A drive gear 62 is mounted at each end of the platen assembly drive shaft 60 on the outer sides of the side plate 52.

First and second vertical members 66 of the frame 12 of the bundle breaker 10 each include a vertical rack 68 which vertical racks 68 are engaged by the drive gears 62 when the first platen assembly 18 is mounted to the frame 12. The vertical racks 68 are located on one side of the vertical member 66 while the guide wheels 64 are located on an opposite side of the vertical members 66. Driving the motor 56 in first and second direction rotates the platen assembly drive shaft 60 and thus the drive gears 62 in first and second directions to move the first platen assembly 18 up and down along the vertical members 66 and thus move the first platen 19 away from and toward the upstream breaking conveyor 14.

The bundle breaker 10 further includes a breaking motor 72 operably connected to a drive disk 74 both of which are mounted on the vertical frame members 66 of the downstream breaking conveyor 14. The breaking motor 72, which may be referred to as a "third actuator," is preferably a servo gear motor with torque feedback similar or identical to the motors 56 used to raise and lower the first and second platen assemblies 18, 20. The downstream breaking conveyor 16 is pivotably connected to the frame 12 at a hinge 76. A connecting arm 78 is connected between a peripheral edge of the drive disk 74, and the vertical support 66 of the upstream breaking conveyor 14. The breaking motor 72 is configured to rotate the drive disk 74 from a first position illustrated in FIG. 3 to a second position illustrated in FIG. 4 which causes the downstream breaking conveyor 16 to pivot about the hinge 76 such that the top surface of the downstream breaking conveyor 16 is no longer substantially coplanar with the top surface of the upstream breaking conveyor 14.

When the score line separating one bundle from an adjacent bundle is linear, the first platen 19 and the second platen 21 can have linear edges that press against the bundles on either side of the score line at locations that are relatively close to the score line. However, when the score line is not linear, for example, when it includes tabs and/or notches, the bundles cannot be effectively broken from the log if the first and second platens 19, 21 are clamped against these tabs and/or notches during a breaking operation. Instead, it is generally desirable to clamp such bundles further away from the score lines to allow the logs to flex for a distance around the breaking region when they break.

It is known from WO 2008/129579 to shape the edges of the first and second platens so that they match the contour of a score line. This allows the platens to apply pressure to the bundles at locations that do not overlie the score lines. However, this solution requires that special platens be provided for each different bundle to be broken.

It is known from US 2010/0108732 to provide fingers on each platen that are slidable in a longitudinal direction (parallel to the travel direction of the logs). These fingers can be positioned so that they do not apply pressure on the score lines and the movement of these fingers allows the shape of the edges of the platens in the breaking zone to be modified to some degree.

SUMMARY

It is desirable to provide a bundle breaker that is configured to break bundles having linear score lines and also configurable to break bundles having non-linear score lines which bundle breaker is simple and efficient to use. It is also desirable to provide a kit to retrofit an existing bundle breaker platen into a platen usable with different types of score lines.

A first aspect of the present disclosure comprises a bundle breaker that has an upstream end and a downstream end, an upstream breaking support having an input end and an output end and a first platen assembly located above the upstream breaking support. A first actuator is operably connected to the first platen assembly and is configured to shift the first platen assembly toward a raised position above the upstream breaking support and toward a lowered position above the upstream breaking support to selectively clamp a first bundle of a log between the first platen assembly and the upstream breaking support. The bundle breaker also includes a downstream breaking support having an output end and an input end at the output end of the upstream breaking support and a second platen assembly located above the downstream breaking support. A second actuator is operably connected to the second platen assembly and configured to shift the second platen assembly toward a raised position above the downstream breaking support and toward a lowered position above the downstream breaking support to selectively clamp a second bundle of the log between the second platen assembly and the downstream breaking support. The bundle breaker also includes a third actuator configured to shift the input end of the downstream breaking support relative to the output end of the upstream breaking support from a first position to a second position to break the second bundle of the log from the first bundle of the log. The first platen assembly and/or the second platen assembly each includes an upper platen assembly and a lower platen assembly supported by the upper platen assembly, and the upper platen assembly includes an upper platen and a support for the upper platen and the lower platen assembly includes a lower platen supported for movement relative to the upper platen in the vertical direction and relative to the upper platen in the longitudinal direction.

Another aspect of the disclosure comprises a kit for converting the platen of a bundle breaker into a platen assembly having an upper platen and a lower platen that is movable vertically and longitudinally relative to the upper platen. The kit includes a first side wall configured to be spaced from a second side wall in a transverse direction, the first side wall and the second side wall each including a top edge, a bottom edge and an inner side surface, the inner side surface of the first side wall being configured to face the inner side surface of the second side wall, a gear rack on the top edge of the first side wall and a first linear bearing on the inner side surface of the first side wall and a second linear bearing on the inner side surface second side wall. At least one vertical shaft depends from the bottom edge of each of the first and second side walls, and each of the vertical shafts includes an end stop. An auxiliary platen is configured to be freely slidably supported on the at least one vertical shafts of the first and second side walls and retained on the at least one vertical shafts by the bottom edges of the first and second side wall and by the end stops. The kit also includes a drive shaft supporting a drive gear and a drive configured to rotate the drive shaft. The auxiliary platen is configured to be supported beneath a primary platen of the bundle breaker by attaching the first and second linear bearings at opposite sides of a support for the primary platen and the drive and the drive shaft are configured to be mounted to the support for the primary platen with the drive gear in engagement with the gear racks.

BRIEF DESCRIPTION OF THE DRAWINGS

These and other aspects and features of the invention will be better understood after a reading of the following detailed description in connection with the attached drawings wherein.

DETAILED DESCRIPTION

Figure 1:
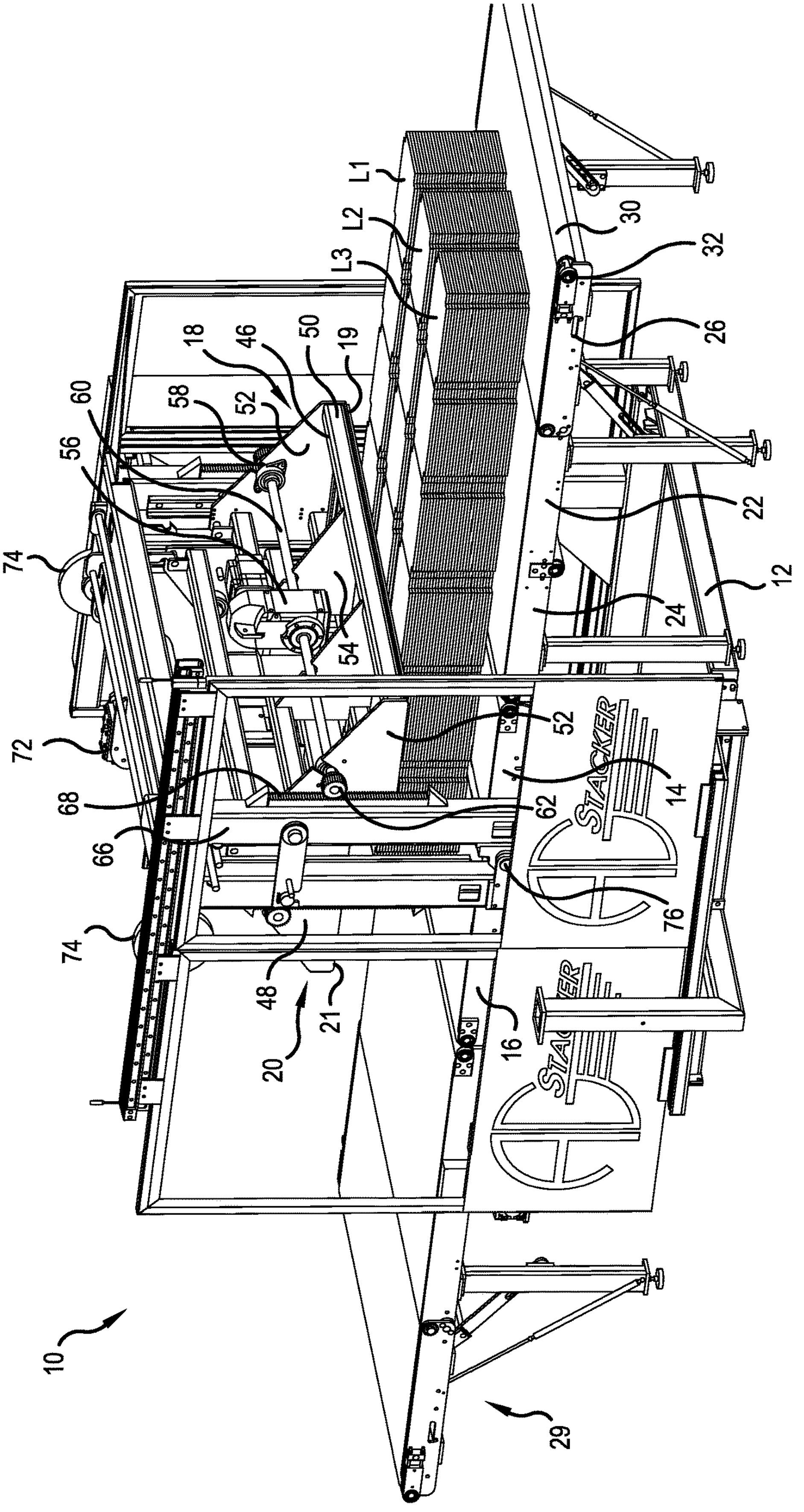
FIG. 1 is a perspective view of a conventional bundle breaker.
Figure 2:
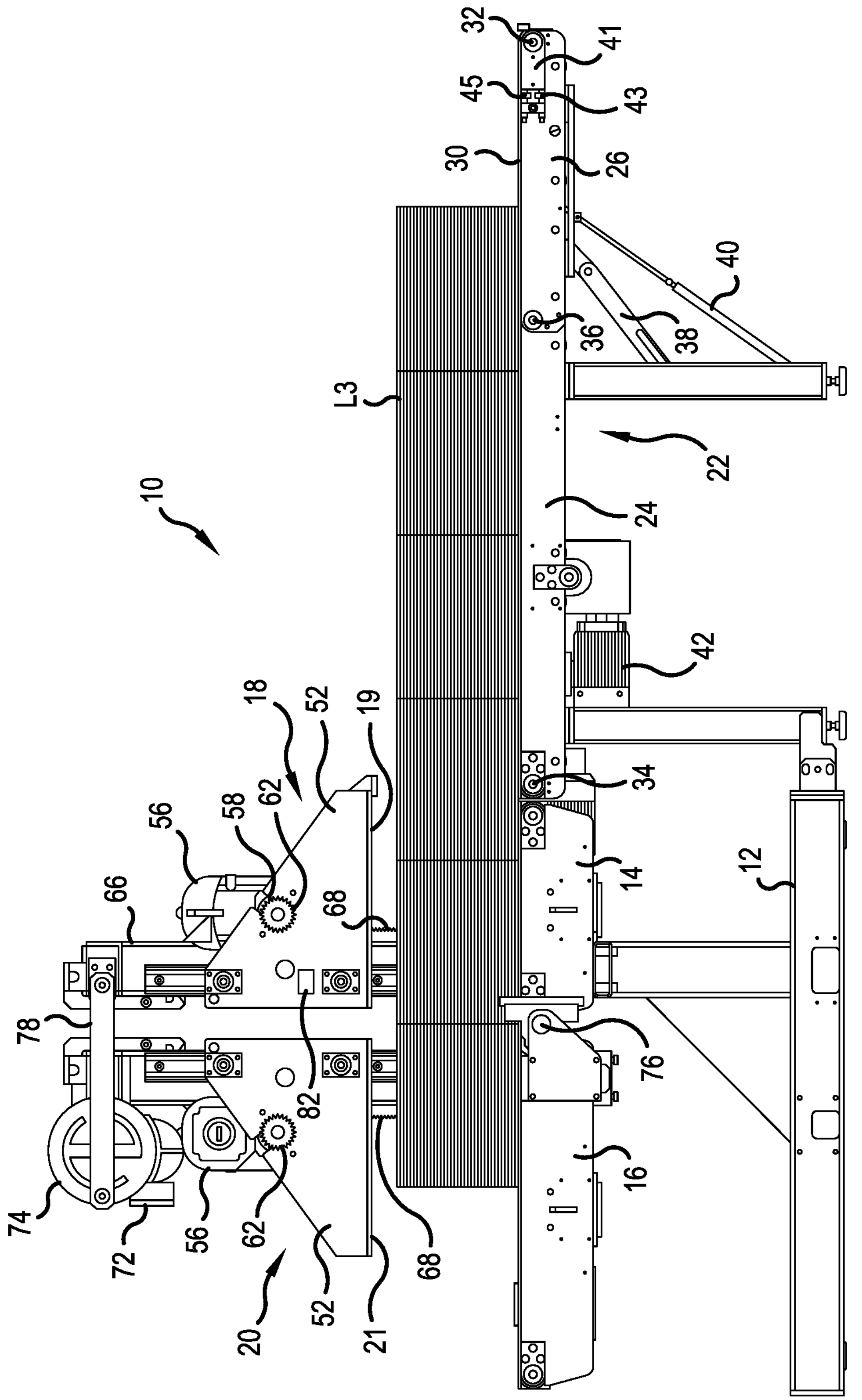
FIG. 2 is a side elevational view of the bundle breaker of FIG. 1 showing a log supported by the bundle breaker with a first bundle of the log positioned between an upstream breaking conveyor and a first platen and a second bundle of the log positioned between a downstream breaking conveyor and a second platen.
Figure 3:
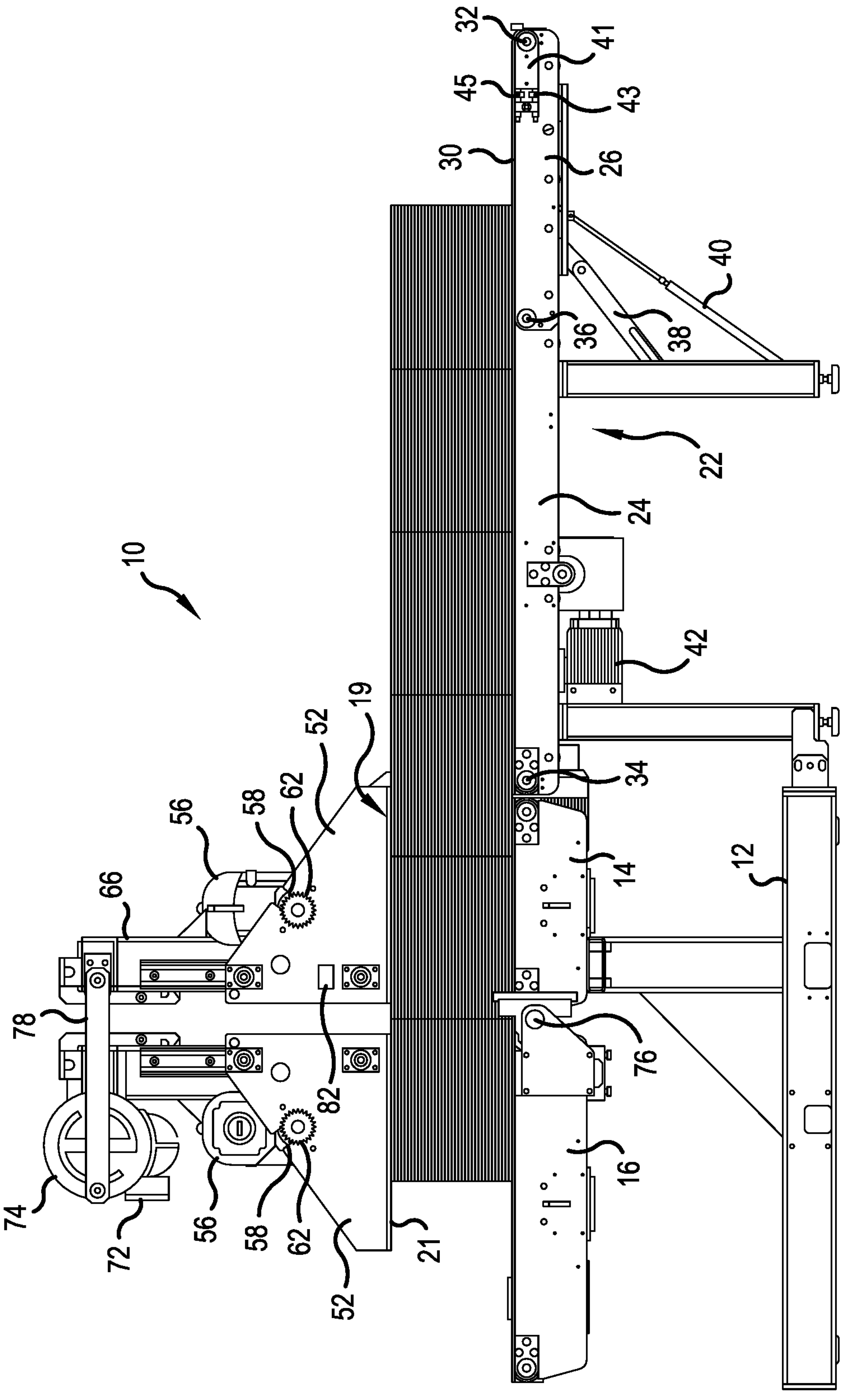
FIG. 3 is a side elevational view of the bundle breaker of FIG. 2 showing the first platen pressing the first bundle against the upstream breaking conveyor and the second platen pressing the second bundle against the downstream breaking conveyor.
Figure 4:
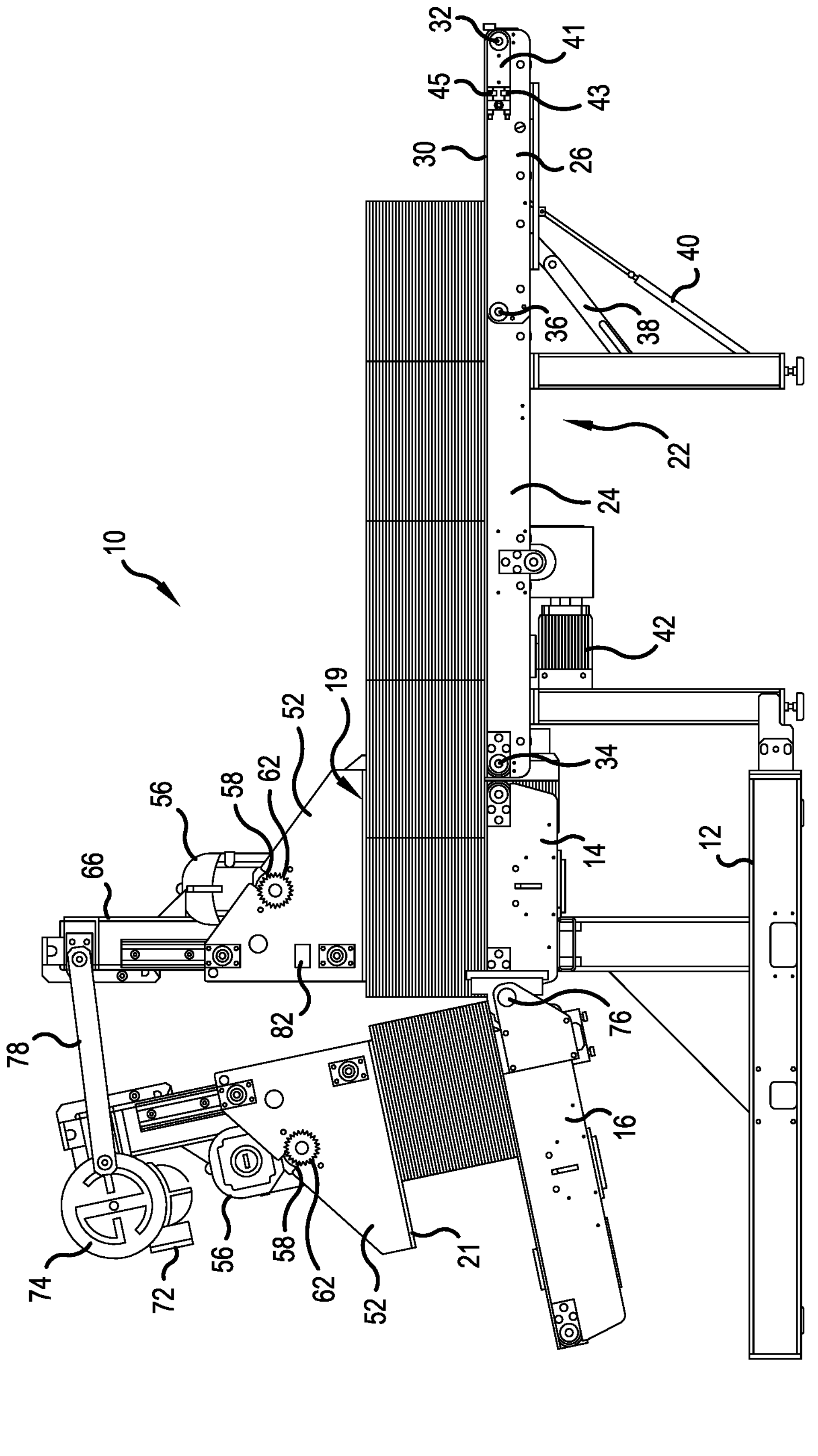
FIG. 4 is a side elevational view of the bundle breaker of FIG. 2 showing the downstream breaking conveyor shifted relative to the upstream breaking conveyor and the downstream bundle broken off the log.
Figure 5:
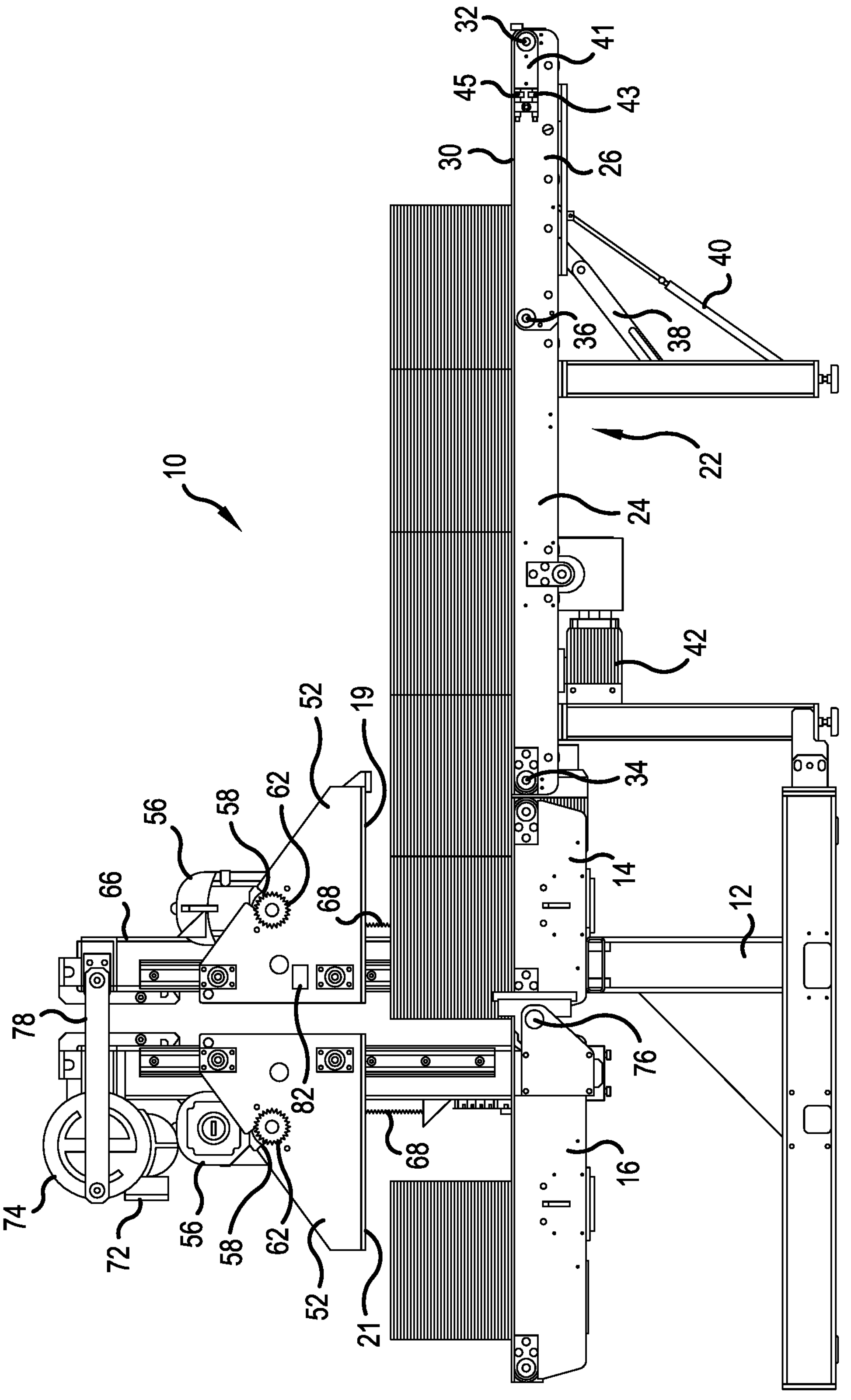
FIG. 5 is side elevational view of the bundle breaker of FIG. 2 showing the downstream breaking conveyor returned to a starting position with its top surface substantially coplanar with the top surface of the upstream breaking conveyor and the first bundle moved away from the log.
Figure 6:
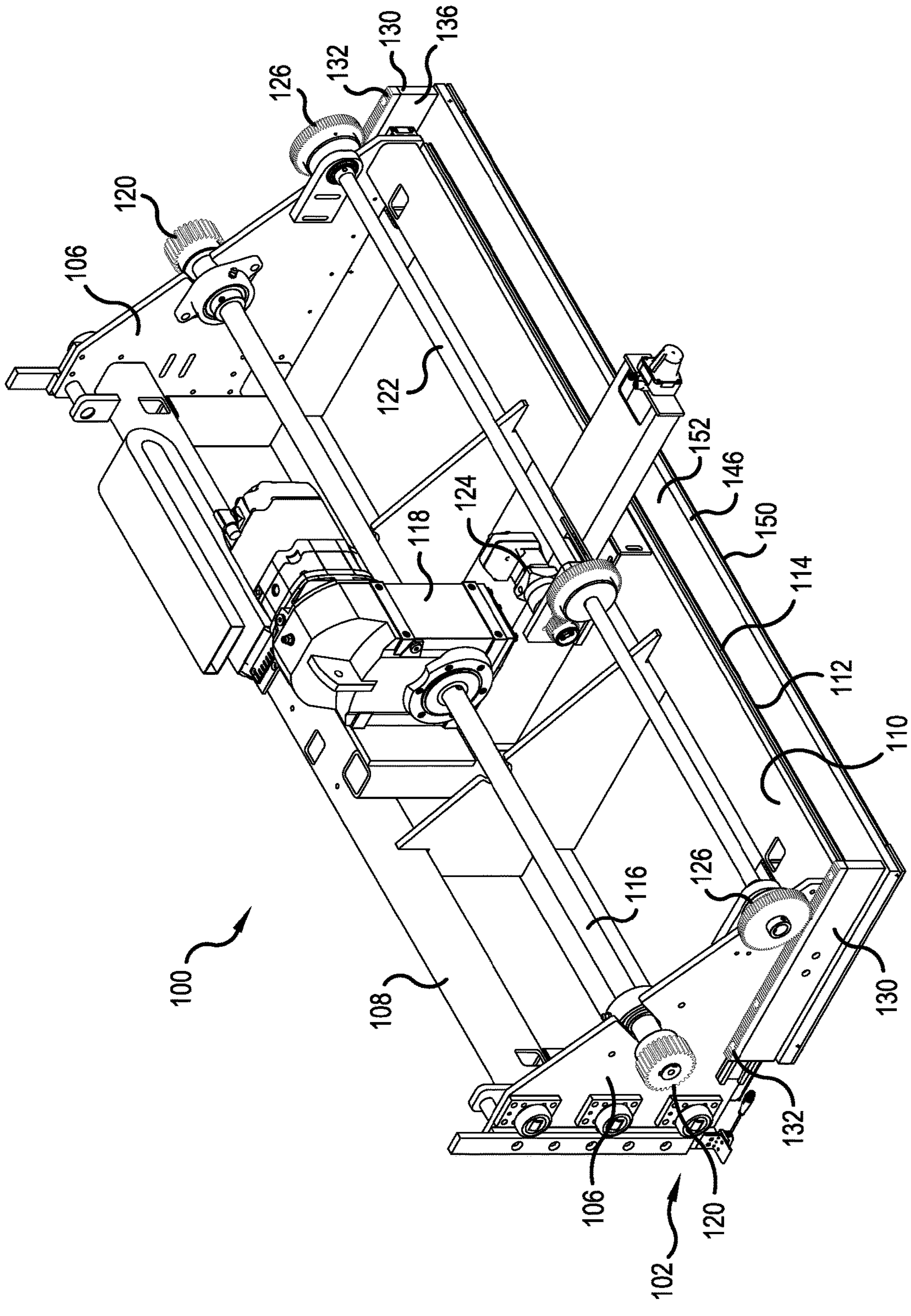
FIG. 6 is a perspective view of a platen assembly for a bundle breaker according to an embodiment of the present disclosure having an upper platen and a lower platen.

FIG. 6 shows a first platen assembly 100 according to an embodiment of the present disclosure that can be used on the bundle breaker 10 in place of the first platen assembly 18 and the second platen assembly 20 of FIGS. 1-5. In addition, as discussed below, an embodiment of the present disclosure comprises a kit to allow the first platen assembly 18 of a conventional bundle breaker 10 to be converted into the first platen assembly 100 of the present disclosure. In the following discussion of a first embodiment of the disclosure, to avoid confusion, elements of the first platen assembly 100 are identified with unique reference numeral even when similar elements are found in the first platen assembly 18 of FIGS. 1-5.

The first platen assembly 100 includes an upper platen assembly 102 and a lower platen assembly 104. The upper platen assembly includes first and second side supports 106 connected by frame elements 108, and an upper platen 110 is fixedly connected to the frame elements 108 such that it is located between the bottom portions of the first and second side supports 106. The upper platen 110 has a bottom surface 112 that may be provided with a rubber or other friction-enhancing covering or coating 114.

A first drive shaft 116 extends between the side supports 106, and a first drive 118 supported by the frame elements 108 is operatively connected to the first drive shaft 116 to rotate the first drive shaft 116. First and second gears 120 are mounted at opposite ends of the first drive shaft 116 on the outer sides of the first and second side supports 106. The first drive 118 turns the first drive shaft 116 to rotate the first and second gears 120 to move the gears along the vertical racks 68 (FIG. 1) to raise and lower the first platen assembly 100 in the same manner described above in connection with the first platen assembly 18 of the bundle breaker 10 shown in FIGS. 1-5.

A second drive shaft 122 extends between the first and second side supports 106, and a second drive 124 supported by the frame elements 108 is operatively connected to the second drive shaft 122. First and second gears 126 are mounted at opposite ends of the second drive shaft 122 on the outer sides of the first and second side supports 106. The second drive 124 turns the second drive shaft 122 to rotate the first and second gears 126.

The bundle breaker 10 can also be provided with a second platen assembly (not illustrated) that is identical to the first platen assembly 100 and that is located above the downstream breaking support 16 and controlled like the second platen assembly 20 of the bundle breaker of FIGS. 1-5.

Figure 7:
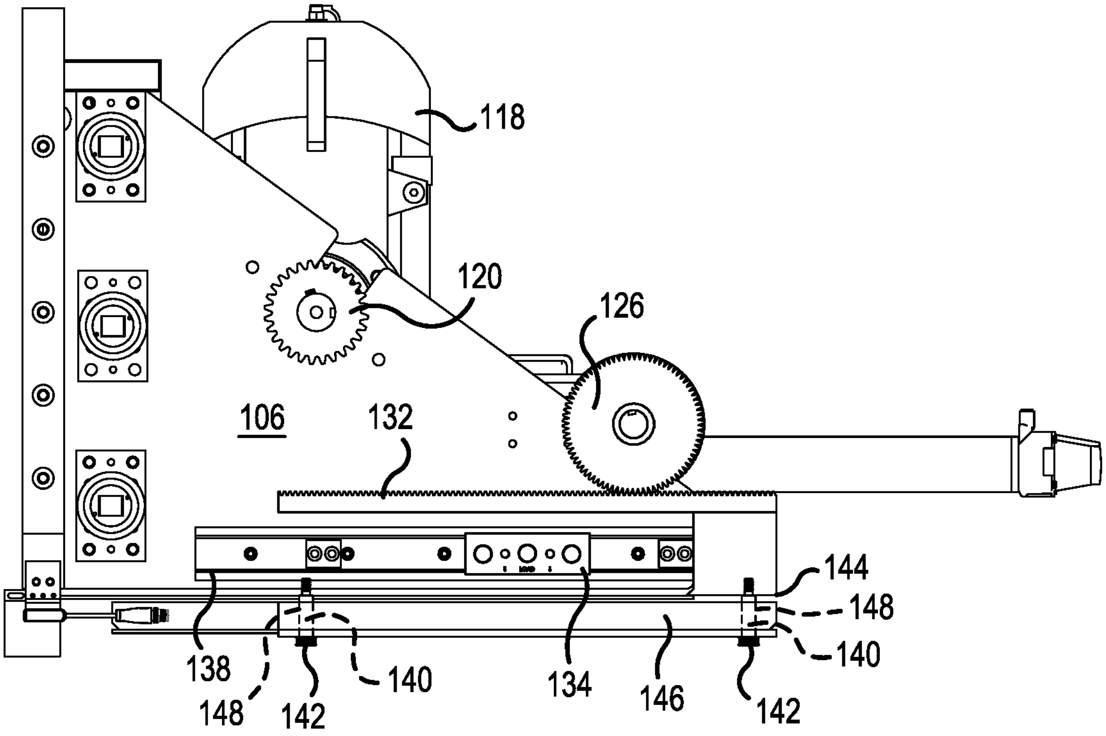
FIG. 7 is a side elevational view of the platen assembly of FIG. 6 with a portion of a side wall removed to show a linear bearing by which the lower platen is supported on the upper platen.

The lower platen assembly 104 includes first and second side walls 130 that extend in the longitudinal direction and are spaced apart in the transverse direction. The first and second side walls 130 each include a gear rack 132 on their top edge and a linear bearing 134 on mutually facing side surfaces 136. The linear bearing 134 is configured to cooperate with bearing rails 138 mounted on the outer surfaces of the side supports 106 of the upper platen assembly 102 to allow the first and second side walls 130 to slide in the longitudinal direction relative to the side supports 106 of the upper platen support 100. The first and second gears 126 of the second drive shaft 122 engage the gear racks 132 when the linear bearings 134 are mounted on the bearing rails 138. FIG. 7 shows the first platen assembly 100 with one of the first and second side walls 130 removed to allow the linear bearing 134 and the bearing rail 138 to be seen.

The second drive shaft 122, the second drive 124, the first and second gears 126 and the gear rack 132 could be replaced with one or more linear actuators (not shown) mounted to the upper platen assembly 102 and connected to the lower platen assembly 104 or mounted to the lower platen assembly 104 and connected to the upper platen assembly 102 to move the lower platen assembly 104 longitudinally relative to the upper platen assembly 102.

Figure 8:
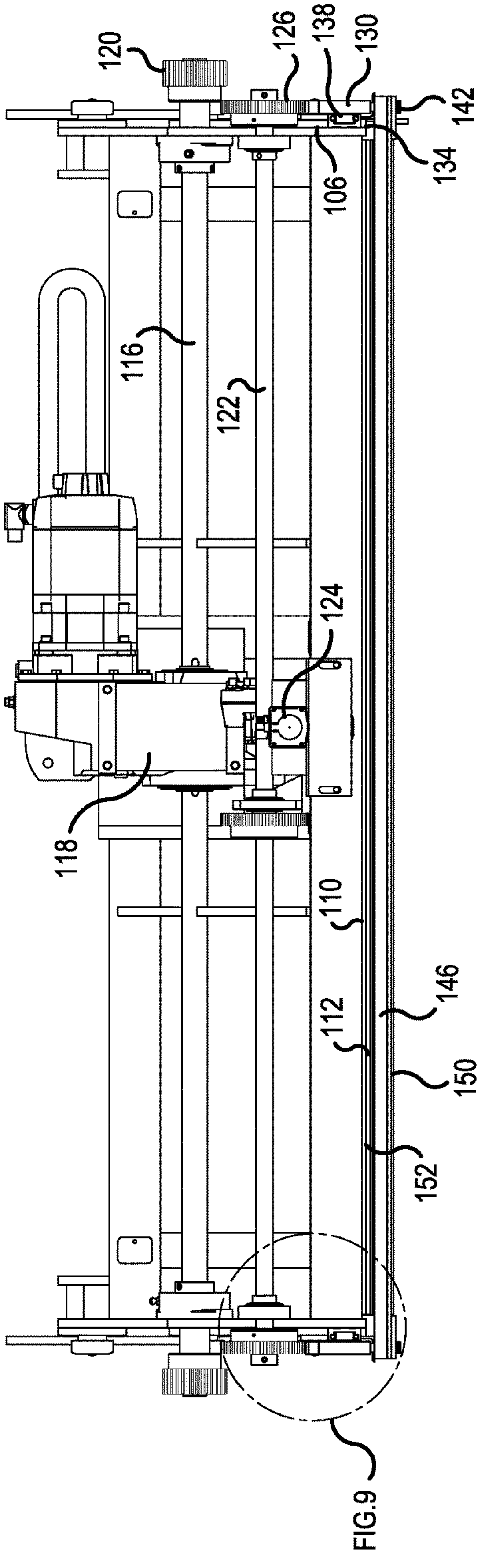
FIG. 8 is a front elevational view of the platen assembly of FIG. 6.

Referring now to FIGS. 7 and 8, two vertical shafts 140 having end stops 142 (which shafts 140 may comprise shoulder bolts) depend from the bottom edge 144 of each of the first and second side walls 130. The vertical shafts 140 extend through four openings 148 at each of the four corners of a lower platen 146, and the diameter of the end stops 142 is greater than the diameters of the openings 148 so that the lower platen 146 cannot be removed from the vertical shafts 140 in the downward direction. The lower platen 146 is freely supported on the vertical shafts 140; that is, the lower platen 146 can be moved upward along the vertical shafts 140 by applying pressure to a bottom surface 150 of the lower platen 146 and moved downwardly along the vertical shafts 140 by the force of gravity by removing the applied pressure. Optionally, springs (not illustrated) can be provided to bias the lower platen 146 away from the upper platen. Upward movement of the lower platen 146 is limited by the contact with the bottom surface 112 of the upper platen 110.

The bottom surface 150 of the lower platen 146 includes a rubber sheet or similar coating or covering for increasing friction between the lower platen 146 and bundles of material on the upstream breaking support 14. A top surface 152 of the lower platen 146 may also be provided with a rubber or other friction enhancing coating, or, in the alternative, may be roughened with ridges or other projections (not shown). The material on the bottom surface 112 of the upper platen 110 and the bottom surface 150 of the lower platen 146 may comprise (but is not limited to) portions of a flexible conveyor belt that is conventionally used to transport paperboard sheets.

In operation, the first drive 118 is controlled to rotate the first and second gears 120 to move the first and second gears 120 along the vertical racks 68 to lift the first platen assembly 100 to a starting position. In the starting position, the lower platen 146 is located at a distance from the top of the upstream breaking conveyor 14 greater than a height of the logs to be processed. In this position, the lower platen 146 rests on and is supported by the end stops 142 of the two vertical shafts 140 that depend from each of the first and second side walls 130. The lower platen 146 is held in position by gravity and its own weight; however, springs (not illustrated) could be provided if desired to ensure the lower platen 146 moves down to the end stops 142 when no upward force is being applied to the bottom surface 150 of the lower platen 146. The second platen assembly (not illustrated but mounted in the location of the second platen assembly 20 in FIG. 1) is controlled in the same manner as the first platen assembly 100 and will not be further described.

With the first platen assembly 100 in this raised position, the upstream breaking conveyor 14 is operated to bring one or more logs (illustrated in FIGS. 1-5) beneath the first platen assembly 100 and the second platen assembly until a breaking region between bundles of the logs lies at a junction of the upstream breaking conveyor 14 and the downstream breaking conveyor 16.

The second drive 124 is then operated to rotate the first and second gears 126 to slide the lower platen 146 longitudinally relative to the upper platen 110 until a downstream end of the lower platen 146 is located in a desired position relative to the breaking region. For example, if logs of the bundle are joined along a straight line, the downstream end of the lower platen 146 will be placed close to (for example, within about 1-3 centimeters of) the linear junction, On the other hand, if the bundles in the log are joined at a non-linear junction, for example, if they include interleaved flaps in the breaking region, the lower platen 146 will be positioned further upstream (e.g., 3-6 centimeters) from the breaking region such that the lower platen 146 does not overlap the flaps. The linear bearings 134 on the first and second side walls 130, which support the lower platen 146, slide freely along the bearing rails 138 because the bottom surface 112 of the upper platen 110 is spaced from the top surface 152 of the lower platen 146 during this movement.

This longitudinal positioning of the lower platen 146 can be performed by an operator observing the relationship of the lower platen 146 to the location of the breaking region and stopping the second drive 124 when the lower platen 146 reaches a desired position. The positioning can also be performed automatically by storing longitudinal positions for the lower platen 146 in a memory of a controller (not illustrated but including e.g., a microprocessor, PLC, etc.) and recalling the appropriate positions for the lower platen 146 based on the known configuration of the breaking regions of the logs to be processed.

Figure 9:
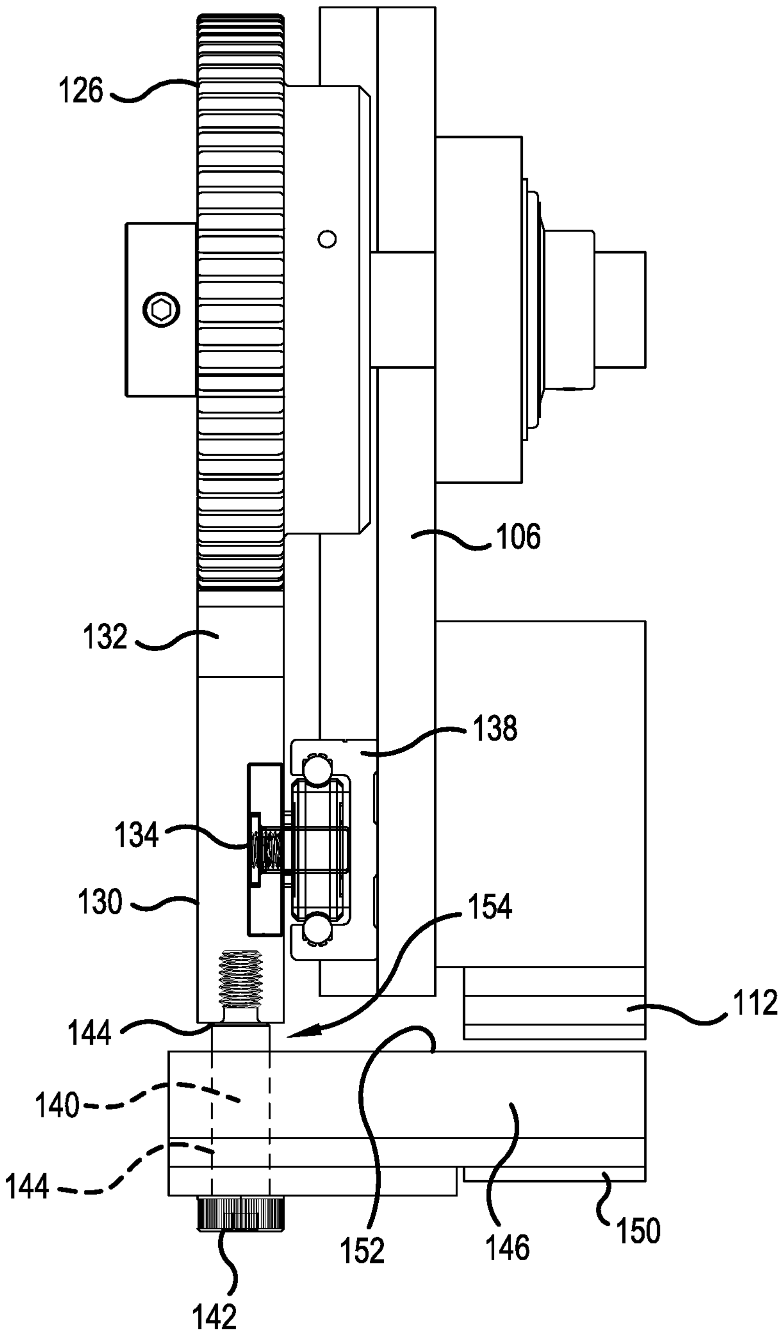
FIG. 9 is a detail view of region A in FIG. 8 showing the top of the lower platen separated from the bottom of the upper platen by a gap.

With the lower platen 146 in the desired position relative to the breaking region, the first drive 118 lowers the first platen assembly 100 until the bottom surface 150 of the lower platen 146 contacts the top surface of the log beneath the first platen assembly 100. At this time, the lower platen assembly 104 is spaced from the upper platen assembly 102 as shown in FIG. 9.

Figure 10:
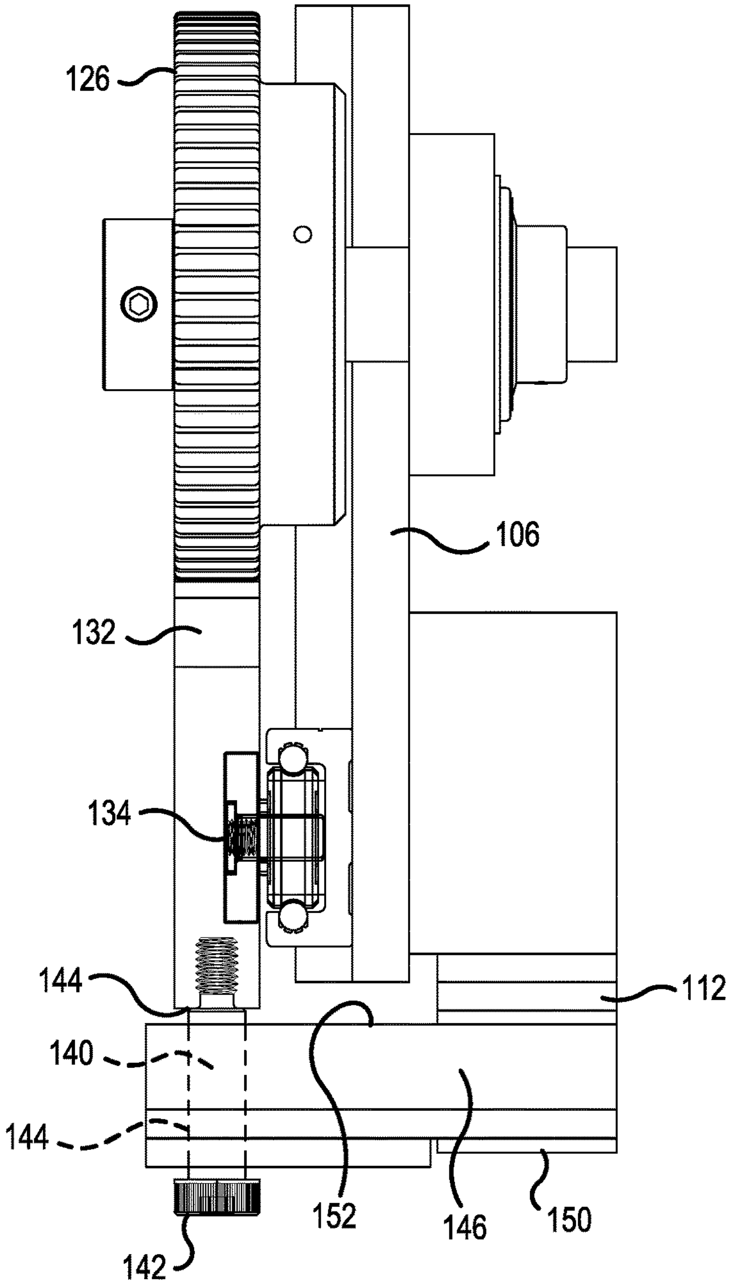
FIG. 10 shows the platen assembly of FIG. 9 with the top surface of the lower platen in contact with the bottom surface of the upper platen.

After this contact, the lower platen 146 is prevented by the log from moving significantly lower, and as the first platen assembly 100 continues to descend, the lower platen 146 remains in contact with the bundle and slides along the four vertical shafts 140 until the top surface 152 of the lower platen 146 comes into contact with the bottom surface 112 of the upper platen 110. This is shown in FIG. 10. Continued downward movement of the first platen assembly 100 presses the lower platen 146 more firmly against the log and may compress the log somewhat until a desired clamping force is obtained.

At this time, the pressure of the upper platen 110 against the lower platen 146, together with the friction-increasing coverings or features on the bottom surface 112 of the upper platen 110 and on the top surface 152 of the lower platen 146 prevent the lower platen 146 from sliding, longitudinally or otherwise, relative to the upper platen 112. Significantly, no further locking mechanism is required to hold the lower platen 146 in position during the remainder of the breaking operation. Furthermore, as can be seen in FIG. 10, even when no gap is present between the upper platen 112 and the lower platen 146, a gap 154 does exist between the top surface 152 of the lower platen 146 and the bottom edges 144 of the first and second side walls 130. Due to this arrangement, the pressing force of the first platen assembly 100 against the log is not transmitted to the gear rack 132 and the first and second gears 126 of the second drive shaft even when significant pressure is being applied to the log.

With two adjacent bundles of the log securely clamped, the breaking operation described above in connection with FIGS. 1-5 is performed, and, at the end of the breaking operation, the first platen assembly 100 is raised to first move the upper platen 112 away from the lower platen 146 and then, after the lower platen 146 slides downwardly along the vertical shafts 140 and comes to be supported by the end stops 142, the lower platen 146 is also lifted from the log by the end stops 142. The log is then shifted downstream until the next two bundles are positioned appropriately relative to the junction between the upstream breaking conveyor 14 and the downstream breaking conveyor 16 and the cycle repeats.

Figure 11:
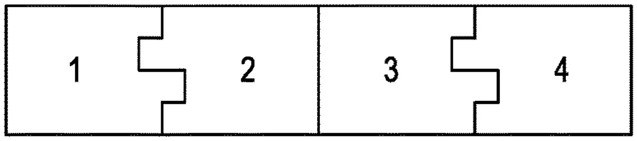
FIG. 11 schematically shows a log including four bundles connected at differently configured breaking regions.

It should be noted that the position of the lower platen 146 can be changed after each breaking operation if the breaking junctions of a given log are not identical. For example, as illustrated in FIG. 11, bundles having tabs may be oriented on a log such that the tabs are interleaved and such that the ends of the bundles that do not include tabs are linear and are adjacent to each other in bundle. Thus, for the illustrated four bundle log, the breaking junctions between bundles 1 and 2 and between bundles 3 and 4 of the log may be non-linear, while the breaking junction between bundles 2 and 3 is linear. In this case, the controller would control the lower platen 146 so that it is located further from the breaking junction when bundle 1 is broken from bundle 2 and when bundle 3 is broken from bundle 4 and closer to the linear breaking junction when the bundle 2 is broken from the bundle 3.

In a second embodiment, the disclosure is related to a kit for converting a platen assemblies of a conventional bundle breaker, e.g., the bundle breaker 10 shown in FIGS. 1-5, into the first platen assembly 100 of the first embodiment discussed above. The kit includes the lower platen assembly 104 discussed above, bearing rails 138, the second drive 124, the second drive shaft 122 and the first and second gears 126. The lower platen 146 may be referred to as an "auxiliary platen" when is provided as part of a kit. To install the kit, the bearing rails 138 are connected to the first and second side supports 52 of the first platen assembly 18 of FIG. 1, and the linear bearings 134 of the lower platen assembly 104 are installed on the rails 138. The second drive 124, second drive shaft 122 and the first and second gears 126 are also installed between the first and second side supports 52 of the first platen assembly 18 with the first and second gears 126 engaging the gear racks 132. With the kit thus installed, the first platen assembly 18 of FIGS. 1-5 is converted into the first platen assembly 100 of FIGS. 6-10. Notably, the material used to form the bottom of the first platen 19, which makes contact with logs before the conversion kit is installed, is suitable to be pressed against the top surface 152 of the lower platen 146 to prevent the lower platen 146 from sliding relative to the upper platen 110 (formerly the first platen 19) when pressure is applied against a log.

The present invention has been described above in terms of presently preferred embodiments. Modifications and additions to these embodiments will become apparent to persons of ordinary skill in the art upon a reading of the foregoing description. It is intended that all such modifications and additions form a part of the present invention to the extent they fall within the scope of the several claims appended hereto.

We claim:

1. A bundle breaker comprising:

an upstream end and a downstream end;

an upstream breaking support having an input end and an output end;

a first platen assembly located above the upstream breaking support;

a first actuator operably connected to the first platen assembly and configured to shift the first platen assembly toward a raised position above the upstream breaking support and toward a lowered position above the upstream breaking support to selectively clamp a first bundle of a log between the first platen assembly and the upstream breaking support;

a downstream breaking support having an output end and an input end at the output end of the upstream breaking support;

a second platen assembly located above the downstream breaking support;

a second actuator operably connected to the second platen assembly and configured to shift the second platen assembly toward a raised position above the downstream breaking support and toward a lowered position above the downstream breaking support to selectively clamp a second bundle of the log between the second platen assembly and the downstream breaking support; and a third actuator configured to shift the input end of the downstream breaking support relative to the output end of the upstream breaking support from a first position to a second position to break the second bundle of the log from the first bundle of the log, wherein a longitudinal direction of the bundle breaker extends from the upstream end of the bundle breaker to the downstream end of the bundle breaker and a transverse direction of the bundle breaker is perpendicular to the longitudinal direction and a vertical direction of the bundle breaker is perpendicular to the longitudinal direction and the transverse direction, and wherein the first platen assembly and/or the second platen assembly each includes an upper platen assembly and a lower platen assembly supported by the upper platen assembly, the upper platen assembly including an upper platen and a support for the upper platen and the lower platen assembly including a lower platen supported for movement relative to the upper platen in the vertical direction and relative to the upper platen in the longitudinal direction.

2. The bundle breaker according to claim 1, wherein the lower platen is shiftable relative to the upper platen between a raised position in which the lower platen is frictionally coupled to the upper platen and a lowered position in which the lower platen is freely slidable relative to the upper platen in the longitudinal direction.

3. The bundle breaker according to claim 1, wherein the lower platen is shiftable relative to the upper platen between a raised position in which a top surface of the lower platen is in contact with a bottom surface of the upper platen and a lowered position in which the top surface of the lower platen is spaced from the bottom surface of the upper platen.

4. The bundle breaker according to claim 3, including an actuator for moving the lower platen assembly longitudinally relative to the upper platen assembly.

5. The bundle breaker according to claim 4, wherein the actuator comprises a servo gear motor.

6. The bundle breaker according to claim 5, wherein the servo gear motor is mounted to and supported by the first platen assembly.

7. The bundle breaker according to claim 3, wherein the lower platen assembly includes a first side wall spaced in the transverse direction from a second side wall, and wherein the first side wall is connected to the upper platen assembly by a first linear bearing and the second side wall is connected to the upper platen assembly by a second linear bearing.

8. The bundle breaker according to claim 7, wherein the first and second side walls each include at least one vertical shaft for guiding movement of the lower platen between the raised position and the lowered position.

9. The bundle breaker according to claim 8, wherein each of the at least one vertical shaft includes a stop for limiting movement of the lower platen away from the upper platen in the vertical direction.

10. The bundle breaker according to claim 9, wherein the first side wall includes a gear rack, and wherein the upper platen assembly includes a gear configured to engage the gear rack.

11. The bundle breaker according to claim 10, including an actuator operatively connected to the gear for rotating the gear to move the gear rack in the longitudinal direction.

12. The bundle breaker according to claim 11, wherein the first platen assembly and the second platen assembly each include the upper platen assembly and the lower platen assembly.

13. The bundle breaker according to claim 11, wherein the upstream breaking support and/or the downstream breaking support comprises a conveyor.

14. The bundle breaker according to claim 8, wherein the at least one vertical shaft comprises two vertical shafts, and wherein the second platen is freely slidable along the two vertical shafts of the first side wall and along the two vertical shafts of the second side wall.

15. The bundle breaker according to claim 1, wherein the first actuator comprises a motor and/or the second actuator comprises a motor and/or the third actuator comprises a motor.

16. A method comprising:

providing the bundle breaker according to claim 1;

positioning the log on the bundle breaker with the first bundle on the upstream breaking support beneath the first platen assembly and the second bundle on the downstream breaking support beneath the second platen assembly, the first bundle being connected to the second bundle at a break region;

holding the first platen assembly above the first bundle such that the lower platen of the first platen assembly is spaced from a top of the first bundle;

moving the lower platen of the first platen assembly longitudinally relative to the upper platen of the first platen assembly to position the lower platen of the first platen assembly relative to the break region;

operating the first actuator to lower the first platen assembly until a bottom surface of the lower platen of the first platen assembly contacts a top surface of the first bundle and continuing to lower the first platen assembly until a bottom surface of the upper platen of the first platen assembly contacts a top surface of the lower platen of the first platen assembly and a predetermined pressure is applied against the top surface of the first bundle;

operating the second actuator to lower the second platen assembly to apply pressure against the second bundle; and operating the third actuator to shift the input end of the downstream breaking support relative to the output end of the upstream breaking support from the first position to the second position to break the first bundle of the log from the second bundle of the log.

17. The method according to claim 16, wherein the lower platen assembly includes a first side wall spaced in the transverse direction from a second side wall, wherein the first side wall is connected to the upper platen assembly by a first linear bearing and the second side wall is connected to the upper platen assembly by a second linear bearing, wherein the first and second side walls each include at least one vertical shaft for guiding movement of the lower platen between the raised position and the lowered position, and wherein the lower platen of the first platen assembly is spaced from the first and second side walls when the lower platen is in contact with the upper platen and when the lower platen is spaced from the upper platen.

18. The method according to claim 16, wherein the first actuator comprises a motor and/or the second actuator comprises a motor and/or the third actuator comprises a motor.

19. A method comprising:

providing the bundle breaker according to claim 1;

positioning the log on the bundle breaker with the first bundle on the upstream breaking support beneath the first platen assembly and the second bundle on the downstream breaking support beneath the second platen assembly, the first bundle being connected to the second bundle at a break region;

holding the second platen assembly above the second bundle such that the lower platen of the second platen assembly is spaced from a top of the second bundle;

moving the lower platen of the second platen assembly longitudinally relative to the upper platen of the second platen assembly to position the lower platen of the second platen assembly relative to the break region;

operating the second actuator to lower the second platen assembly until a bottom surface of the lower platen of the second platen assembly contacts a top surface of the second bundle and continuing to lower the second platen assembly until a bottom surface of the upper platen of the second platen assembly contacts a top surface of the lower platen of the second platen assembly and a predetermined pressure is applied against the top surface of the second bundle;

operating the first actuator to lower the first platen assembly to apply pressure against the first bundle; and operating the third actuator to shift the input end of the downstream breaking support relative to the output end of the upstream breaking support from the first position to the second position to break the first bundle of the log from the second bundle of the log.

20. The method according to claim 19, wherein the lower platen assembly of the second platen assembly includes a first side wall spaced in the transverse direction from a second side wall, wherein the first side wall is connected to the upper platen assembly of the second platen assembly by a first linear bearing and the second side wall is connected to the upper platen assembly of the second platen assembly by a second linear bearing, wherein the first and second side walls each include at least one vertical shaft for guiding movement of the lower platen of the second platen assembly between the raised position and the lowered position, and wherein the lower platen of the second platen assembly is spaced from the first and second side walls when the lower platen is in contact with the upper platen and when the lower platen is spaced from the upper platen.

21. The method according to claim 19, wherein the first actuator comprises a motor and/or the second actuator comprises a motor and/or the third actuator comprises a motor.

* * * * *